United States Patent [19]
Shanton

[11] Patent Number: 5,680,452
[45] Date of Patent: *Oct. 21, 1997

[54] DISTRIBUTED CRYPTOGRAPHIC OBJECT METHOD

[75] Inventor: M. Greg Shanton, Manassas, Va.

[73] Assignee: TECSEC Inc., Vienna, Va.

[*] Notice: The term of this patent shall not extend beyond the expiration date of Pat. No. 5,369,702.

[21] Appl. No.: 394,402

[22] Filed: Feb. 24, 1995

Related U.S. Application Data

[63] Continuation-in-part of Ser. No. 304,867, Sep. 13, 1994, which is a continuation of Ser. No. 138,857, Oct. 18, 1993, Pat. No. 5,369,702.

[51] Int. Cl.⁶ .................................................. H04L 9/00
[52] U.S. Cl. .................. 380/4; 380/9; 380/21; 380/23; 380/25; 380/28; 380/49; 380/50; 340/825.31; 340/825.34
[58] Field of Search ........................... 380/3, 4, 5, 9, 380/10, 23, 24, 25, 21, 49, 50, 28, 30, 43; 340/825.31, 825.34; 455/33, 3

[56] References Cited

U.S. PATENT DOCUMENTS

| | | | |
|---|---|---|---|
| 4,218,582 | 8/1980 | Hellman et al. | 380/30 |
| 4,405,829 | 9/1983 | Rivest et al. | 380/30 |
| 4,424,414 | 1/1984 | Hellman et al. | 380/30 |
| 4,713,753 | 12/1987 | Boebert et al. | 380/4 X |
| 4,864,616 | 9/1989 | Pond et al. | 380/25 |
| 4,955,082 | 9/1990 | Hatoori et al. | 455/33.3 |
| 4,962,533 | 10/1990 | Krueger et al. | 380/25 |
| 4,984,272 | 1/1991 | McIlroy et al. | 380/25 |
| 5,052,040 | 9/1991 | Preston et al. | 380/4 |
| 5,065,429 | 11/1991 | Lang | 380/25 |
| 5,191,611 | 3/1993 | Lang | 380/25 |
| 5,204,961 | 4/1993 | Barlow | 380/4 X |
| 5,369,702 | 11/1994 | Shanton | 380/4 |
| 5,369,707 | 11/1994 | Follendore III | 380/25 |

*Primary Examiner*—Bernarr E. Gregory
*Attorney, Agent, or Firm*—Rabin, Champagne & Lynt, P.C.

[57] ABSTRACT

A system for increasing the security of a computer system, while giving an individual user a large amount of flexibility and power. To give users the most power and flexibility, a standard object that has the capability to embed objects is used. To allow users even more flexibility, a standard object tracking mechanism is used that allows users to distribute to other individuals multiple encrypted objects embedded in a single encrypted object. By effecting compartmentalization of every object by label attributes and algorithm attributes, multi-level multimedia security is achieved. Label attributes are used to restrict access to objects based on location, group, or other criteria and may specify personal access. Access type, such as read-only, write-only, and print-only may be specified. Nested embedded objects may be accessed directly through selection from a header array.

17 Claims, 8 Drawing Sheets

KING ALLEY CONSORTIUM
AMBI RIVER PROJECT

KING ALLEY CONSORTIUM
AMBI RIVER PROJECT

5,680,452

DISTRIBUTED CRYPTOGRAPHIC OBJECT METHOD

This is a continuation-in-part of U.S. patent application Ser. No. 08/304,867, filed Sep. 13, 1994, which is a continuation of U.S. patent application Ser. No. 08/138,857, filed Oct. 18, 1993, which issued as U.S. Pat. No. 5,369,702 on Nov. 29, 1994.

FIELD OF THE INVENTION

The present invention relates generally to communications security systems. In particular, the system of the present invention relates to computer security systems and means of restricting access to data stored on or communicated by computers.

BACKGROUND OF THE INVENTION

The specter of spies eagerly trying to obtain the defense information of various countries is very much still present in the defense and intelligence community. An equally dangerous threat also exists in the form of technological or commercial spies who desire to obtain commercial and technical information from competing companies, and who may use industrial espionage in their efforts to gain access to this information. Such espionage may include the use of sophisticated means similar to those used by the defense and intelligence community. The data obtained may include commercially valuable information that reveals the plans and commercial activities of competitors, the acquisition of which allows the aggressor company to obtain a competitive advantage in the marketplace. Theft of commercially valuable information is a very real and ever present threat.

To combat this type of commercial spying and protect company proprietary information, various complex systems have evolved to protect proprietary information. These systems usually employ physical controls over personnel as well as over the data flowing in and out of a company. For example, most computer systems used within companies require a password or passphrase to be entered before the system can be accessed. It is frequently the case that confidential or company proprietary information must be passed electronically from one location to another in order to convey that information between employees within the company in a timely fashion. Such electronic communication is highly susceptible to interception if not protected in some manner. Passphrase protection is not adequate to protect against interception or corruption of data in transmission.

Cryptographic systems have evolved to fill the needs of companies and individuals wanting to protect proprietary commercial information from competitors and others who generally should not be privy to that information. Such systems ensure that data is not recognizable to unauthorized parties who intercept it. Only authorized persons would have the means for decrypting the data and returning it to readable form.

For example, U.S. Pat. No. 4,405,829 to Rivest et al. discloses a cryptographic communications system utilizing a particular manipulation of data to be transmitted in order to effect encryption. The data is first encoded as a number in a predetermined set, which is then raised to a predetermined power corresponding with the intended receiver. The result is then divided by the product of two predetermined prime numbers corresponding with the intended receiver. The remainder of this division is the cipher text. A reverse procedure is followed at the receiver to decrypt the cipher text.

Encryption of data is therefore a critical requirement in controlling access to confidential information. Cryptographic "keys" are an essential part of the data encryption process. The cryptographic key, or "key" for short, is a data stream that is manipulated with plain (readable) text data according to a cryptographic algorithm to transform the plain text data to a string of unintelligible text or signals known as encrypted text or cipher text. The key is then used by an authorized receiver of the cipher text to decrypt the message, returning it to plain text form. However, for two people to communicate successfully using such a cryptographic system, each must use the same key, assuming that the same encryption/decryption algorithm is used on both ends of the communication. Thus, a system must be put into place for the distribution and other management of these keys within the closed group of authorized users.

For example, U.S. Pat. No. 4,218,582 to Hellman et al. discloses a public key cryptosystem for providing secure data transmission. According to the Hellman et al. system, a receiver generates a secret key and a public key, such that the secret key is difficult to generate from the public key, which in turn is easy to generate but is difficult to invert without the secret key. The transmitter encodes the data using the public key. The encrypted message is then transmitted to the receiver, which decrypts the data using the secret key. U.S. Pat. No. 4,424,414 to Hellman et al. discloses a similar system which uses an exponentiation function rather than a public key.

Various methods have evolved to manage the distribution of keys. Such methods of distribution are commonly referred to as "key management". The function of key management is to perform the process of generating, distributing, changing, replacing, storing, checking on, and destroying cryptographic keys. Under normal operational circumstances, the key manager begins and ends a cryptographic session by controlling access to the algorithm used to encrypt and decrypt plain text objects. Thus, a user who wants to encrypt an object or decrypt an object must first access the key manager so that an encryption algorithm may be chosen.

Simple encryption of data being communicated between two points only provides one level of security, however. Encryption limits data communication to those who have the key. Anyone who has the key is privy to any communication at any location. That is, if a group of people are working on a particular project, they will all presumably share a key for decrypting information relating to the project. Some of the project group may be working in one location, while the rest of the group may be located in a distant city. If one member of the group wants to send a communication to be read only by a particular member in the other city, the key will afford him no protection because everyone in the project shares the same key, and therefore will have access to the communication. Likewise, if someone wants to communicate a message to a subset of the group, for example, only to management personnel, this key would again provide her with no extra security. In another case, someone may want to send a message that is capable of being read only at a particular computer terminal, or of being printed only at a particular printer. In these and other cases, multilevel multimedia key access or individual keys issued to each person, would provide a solution, albeit one that is quite unwieldy, inflexible, and difficult to manage by a security officer or key administrator.

A secure method of labeling files or messages that are sent from a sending user to a receiving user over a network can provide a level of protection in addition to cryptographic protection. A file "label" relative to the present invention means a series of characters, which may or may not be encrypted, separate from the file or message but associated with the storing of a file or the sending of a message, which identifies the person, location, equipment, and/or organization which is permitted to receive the associated message or to read or modify an associated file. Using a secure labeling regimen, a network manager or user can be assured that only those messages or files meant for a certain person, group of persons, and/or location(s) are in fact received, decrypted, and read by the intended receiver. Thus, a sending user can specify label conditions that limit access to the transmitted message. For example, many people within a company may have the key necessary to read a data file that a sender may transmit from his computer terminal to other terminals at another site within his company. The sender may, however, wish to restrict reception to those persons present at a particular terminal. By employing a secure labeling technique in addition to encryption, the sender can be assured that people having the correct key to decrypt the message but working at different terminals will not receive or be allowed to access the communication. Using such a scheme, access may be limited to particular people as well.

U.S. Pat. No. 5,369,707 to Follendore III discloses a system for encrypting and labeling files in order to limit access to them. Access is limited only to particular users or groups of users, however. Using the Follendore system, access cannot be limited to, for example, a particular printer.

Likewise, U.S. Pat. No. 5,052,040 to Preston et al. discloses a multiple-user stored data cryptographic labeling system that uses labels to control access to data files. Objects other than data files are not controlled by this system, and even these data file objects do not have the capability of being cryptographically embedded.

A system that can limit access on an object level would be more flexible and would offer still more protection. Access could be specified on an object-by-object basis, and objects could be embedded within other objects, providing an access hierarchy for users.

The ability to cryptographically secure objects ensures the authentication and data integrity of the particular object or objects in question. If a system were able to cryptographically control an object or nested objects, then that system would have total control over the entire object and all other objects within it. This type of control over the knowledge/ information flow would allow for clear data separation, and at some levels could become a transparent method. A system that is able to do this would be able to achieve multi-level multimedia security.

SUMMARY OF THE INVENTION

It is therefore an objective of the present invention to provide a system that insures that properly specified kinds of information in a network system flows only to designated locations and to further insure that such information is only read by those individuals who are designated to review that information.

It is a further objective of the present invention to provide a system that recognizes objects and permits or denies access on the object level.

It is an additional objective of the present invention to provide a system in which objects may be embedded within other objects, resulting in an access hierarchy for users of the system.

It is another objective of the present invention to provide a system in which access control is transparent to the user.

These and other objectives and advantages of the present invention will be apparent to those of ordinary skill in the art upon inspection of the detailed description, drawings, and appended claims.

The present invention is a data processing system which can be used to select and encrypt objects. The encrypted objects, either individually or in groups, can be embedded in other objects called container objects, which may also be encrypted. This process is based on a technique called cryptographic encapsulation. The original representation of the object embedded within this container object can then be deleted, as all of the contained object information can be found in encrypted form within the container object. The container object can be further embedded within another container object. Container objects can only be "opened", that is, decrypted, by users having access authority in the form of a cryptographic key and who are using the proper cryptographic engine. Existence of the embedded object is not even known to users who don't have access to the container. The present invention can be utilized with all objects in the system, including standard software applications, utilities, operating systems, and devices. Device objects can be embedded within other device objects, or within a data file object. For example, a printer object may be embedded within a file object; only a user having cryptographic access to the data file will know of the accessibility of the system to the printer.

The definition and concept of objects varies greatly depending on with whom you consult. Everything around you in your daily life is an object. Your car, your car keys, books, people, desks, etc. are all objects in the ordinary sense of the word. Objects are entities by themselves, but they may contain other objects, in either single or multiple configurations. Objects can change their make up dynamically by inheritance. Objects can inherit the attributes of other objects and the inheritance features can change dynamically "on the fly" during the operation of the objects.

In the context of the present invention, objects can come in a vast number of forms, shapes, or sizes and can be either passive or active, dynamic or static. An object may stay dormant until it is acted upon, or it may be an active participant, dynamically auditing and verifying every transaction that occurs in a system. Examples of what an object can be include a bit of information, a byte of information, Sound Clips, Video Clips, Graphic Images, text, charts, tables, forms, controls, MDIForms, variables, executable files, video files, binary files, text files, data files, container files, graphic files, application file(s), library files, a directory, a collection of directories, a hard disk, multiple hard disks, any hardware component, any software component, a complete computer system, a single network, and multiple networks.

Thus, an object is any distinct, separate entity. In a computer or data communication context, entities that may be treated as objects include:

1) Program objects, representing applications such as word processors, spreadsheets, games, etc., as well as utilities and operating systems;

2) Folder objects, representing collections of other objects;

3) Data file objects, including information such as text, memos, letters, spreadsheets, video, and sound; and 4) Device objects, such as printers, fax modems, plotters, and CD-ROM drives.

In object linking and embedding processes, an object can be any user-selected group of data, such as a block of text, a set of spreadsheet cells, a chart, sounds, or a graphical image. These data can be embedded in or linked to another document created by a different application. For example, a folder may represent a directory and may contain a group of files, or it may represent a group of programs. Folders can also contain other folders.

In object-oriented programming, a program consists of a set of related but self-contained objects that can contain both code and data.

As previously stated, the system of the present invention may be used to encrypt and embed objects. The encrypted objects are then not accessible to someone not having a proper key or cryptographic engine. Encrypted embedded objects are not even known to those who do not have access to the container object. Access to the file is further restricted through the use of labels. A label is a field of characters attached to the encrypted file. The label may define a group of people that may have access to the file. The label may define the device at which the file may be accessed. The device may define a single person who may have access. A label may also define the type of access, that is, read only, write only, read and write, print only, etc., that authorized persons may have. A label may also define any combination of authorized people, devices, objects, and/or access type. Thus, the label is a flexible, powerful way to set forth with great specificity all conditions that must be fulfilled in order to gain the defined access to the file. Multiple labels may be attached to an encrypted object. The maximum number of labels that may be used with an object is limited only by the capabilities of the host computer. The system of the present invention is contemplated for use with N labels per object, that is, with any number of labels deemed useful or necessary by the user.

It is important to note that the label is preferably attached to an encrypted object. Thus, an authorized person specified in the label must still have a key to decrypt the object. The system of the present invention can restrict access to an object using labels only, but much stronger protection is available if the object is encrypted as well. Further, passphrase protection is preferably included as a first line of protection. Thus, an authorized user would preferably need three elements to access an object: the correct passphrase, the correct key, and authorization in the label.

For example, a family may own a personal computer ("PC") having a CD-ROM drive, a printer, and a modem. Each member of the family may have a unique passphrase allowing basic access to the PC. The family may include an 11-year old boy whose friends also have been given passphrases so that they can all do homework or play computer games together. However, some files on the PC may contain personal family information; these files may be encrypted, with only family members having keys to decrypt these files. The parents may also wish to restrict the boy's access to the modem because they are afraid that he may run up expensive on-line charges. The modem object may be placed in a container object. This container object may then be encrypted and labelled such that the boy is not granted access to the container object. Thus, not only will the boy not have access to the modem, he will not be able to determine that the modem is embedded within the container object. The parents may also put restrictions on themselves. They may have stored certain important documents on their system which they must reference occasionally, but which must not be changed. They may use the label restriction to give themselves read only access to these documents, insuring that the text is never inadvertently changed. Alternatively, they could restrict themselves to print only access. Thus, when access is attempted, the system of the present invention would determine that they have print only access, would decrypt the file using their key, and would present only print options to them on the display, rather than an image of the document itself. Their only option regarding this document would be to print.

The label may appear as a header to authorized users. This header can include pertinent information about the label, such as a list of authorization attributes and a specification of object type. For example, the header may identify the object as a container object, and may further list the objects embedded in the container object, preferably in the form of an array, or tree structure. This form of presentation is preferable because it is more meaningful to a user when the container object contains other container objects as well as other embedded objects, although other header structures, such as lists, may also be utilized. These lower level container objects may also contain further container objects, and so on, for as many levels as needed by the users, limited only by the amount of memory available on the host computer. In the preferred embodiment, users who are not authorized access to the container object will not be able to read the header in decrypted form, and users who are authorized access to the container object but not to one or more objects embedded in the container object will not be able to read the corresponding header array element.

Thus, the header array will show a user all the objects to which he has access. Using this header, the user is allowed random access to any object embedded in the container object at any level, as long as that particular user is authorized at that location. The user simply selects an object embedded at a level lower than the one he has currently accessed, and the system will open all objects along the path between the highest level object and the selected object. Obviously, this will only be allowed if the user has access to all objects along the path. Thus, the user does not have to open the objects along the path one at a time; the system will open them automatically. Of course, the user has the option of opening the objects one at a time if this is desired.

As an alternative to having the labels attached to each encrypted object, the labels may be attached to an object called an access control list ("ACL"). The ACL will contain the labels corresponding to a number of different objects. When access to one of these objects is attempted, operation is directed to the ACL, which provides the system with the information needed to grant or deny access to the user. If access is granted, operation is directed back to the target object. If access is denied, operation is directed back to the system of the present invention, which preferably will display a message to the user saying that access has been denied.

The system of the present invention is able to increase the security of the system, while at the same time giving the individual user a large amount of power and flexibility. To give users the most power and flexibility, a standard object that has the capability to embed objects is preferably used. To allow users even more flexibility, a standard object tracking mechanism is preferably used that allows users to distribute multiple encrypted embedded objects to other individuals in a single encrypted object. By being able to compartment every object by label attributes and algorithm attributes, multi-level multimedia security is achieved.

In addition to encryption, compression may be performed on objects prior to storage or transmission. Compression of the object can take place at any stage in the method of the present invention, but preferably takes place prior to encryption. According to the system of the present invention, a number of compression algorithms may be stored. The particular algorithm used to compress the object may be selected by the user, or may be chosen in a sequence or at random by the system.

Multi-level security is achieved because encrypted objects may be nested within other objects which are also encrypted, possibly within other objects, resulting in multiple layers of encryption. Multimedia security is achieved because objects of all types are encrypted. Where other encryption systems encrypt only files or other data, the system of the present invention encrypts any object, encompassing all forms of media. Thus, the nesting of individually encrypted objects provides security that is multilevel and multimedia.

DETAILED DESCRIPTION OF THE INVENTION

Definitions

OOKeyMan® stands for the Object-Oriented Key Manager. OOKeyMan® is a Microsoft® Windows™ stand-alone application.

The Auto Application Interface is an intelligent front-end and back-end interface between a standard Microsoft® Windows™ application and OOKeyMan® or other key manager.

An Encrypted Embedded object is an encrypted OOKeyMan® object which can contain a single plain text object that has been encapsulated within the encrypted object, or it can contain an infinite web of encrypted objects matched with plain text objects or other cipher text objects.

A container object is an object that contains other objects (embedded objects). These embedded objects can be either cipher text or plain text. This is the transport vehicle for a standard object mechanism that embeds objects. A non-container object is an object that does not contain other objects.

Multi-Level Multimedia Security is defined as the ability to have simultaneous control over the knowledge and information flow of numerous media formats while allowing for clear data separation. At some levels the multi-level multimedia security becomes transparent. Examples of multimedia objects would include a file that contained two or more of the following: sound objects, video objects, graphic V, text objects, chart objects, table objects, and form objects.

Disclosure

The present invention, which shall be referred to as the Distributed Cryptographic Object Method ("DCOM"), is able to control which objects are visible to a specific user, which object attributes are inherited by other objects, which objects are available for use, and which level of system implementation can become transparent.

A function of the present invention is to securely manage and track encrypted objects. The present invention can securely manage and track a single encrypted object, or it can securely manage and track encrypted objects embedded within other encrypted objects. The capability to securely manage and track encrypted objects within other encrypted objects is only limited by storage space.

Figure 1:
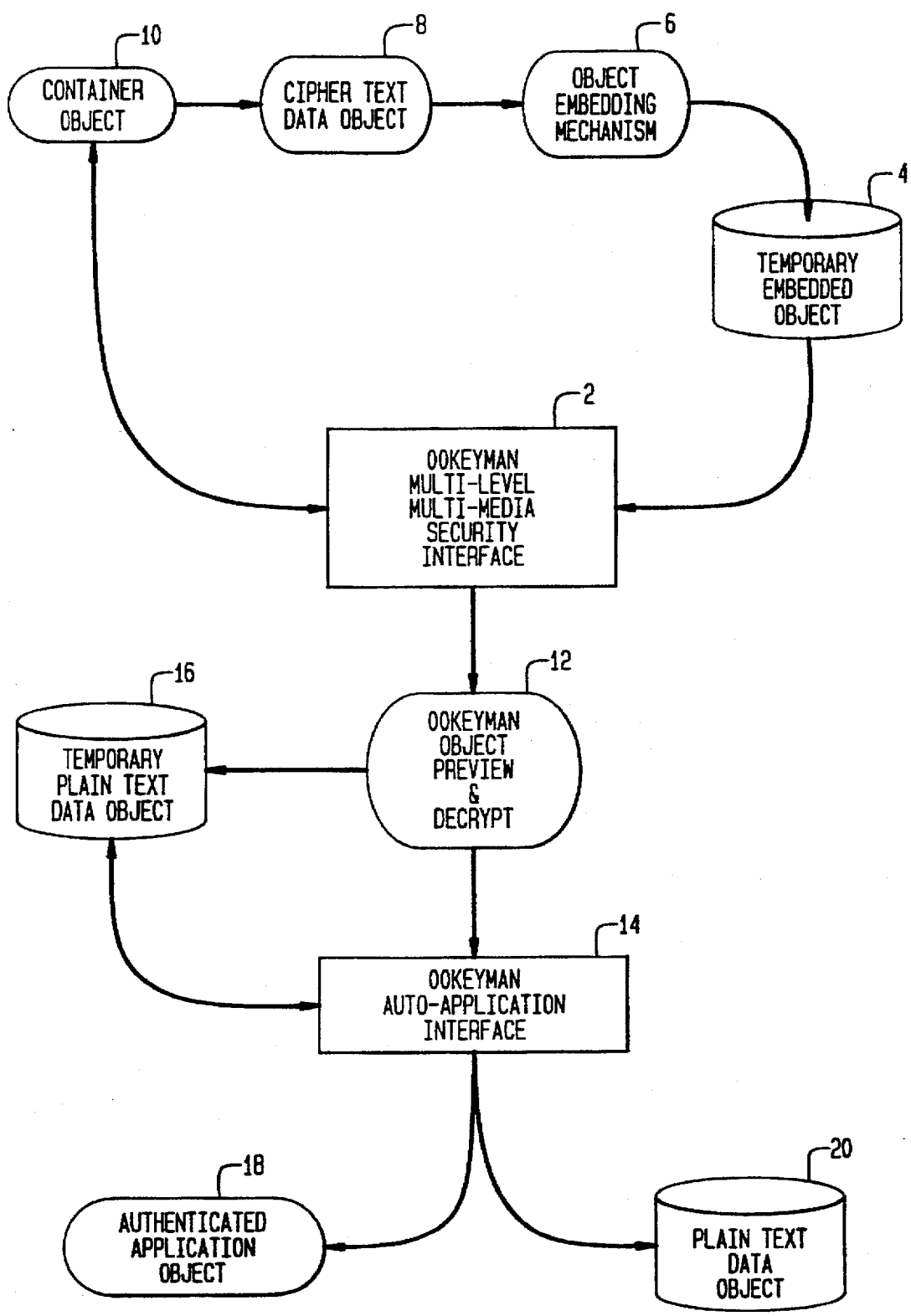
FIG. 1 shows a block diagram of the system of the present invention.

Referring to FIG. 1, the system of the present invention is described. The system has a standard Multi-Level Security object interface 2 that interfaces with a plain text container object's encrypted embedded object(s) 4. It does this through a standard application 6 that has the capability to embed an object in a container object, such as Microsoft® Object Package for Windows™. After the encrypted object (s) is/are embedded in a standard container object(s) 10 and the container object(s) 10 is/are encrypted, the original encrypted object(s) and the new encrypted container object (s) is/are ready for transport.

Figure 2:
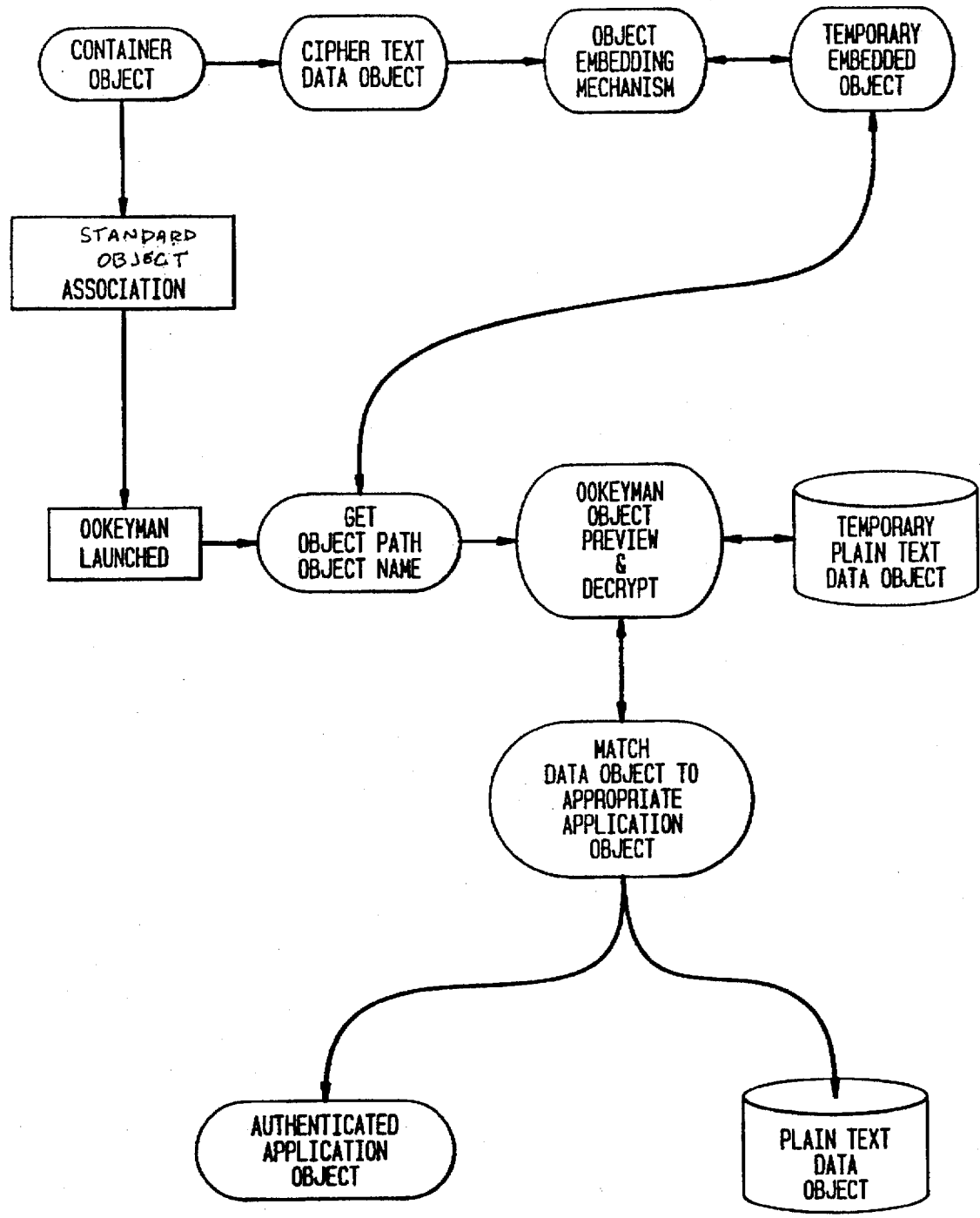
FIG. 2 shows a block diagram of the system of the present invention when an embedded encrypted object is activated.

The new encrypted object(s) can be easily transported/ routed without modification over any network that supports binary travel. The original encrypted objects can be deleted because all information from the original encrypted objects is encapsulated in the embedded encrypted object. All of the nested embedded encrypted objects will appear to a user as a single encrypted object until extracted with a standard object embedding/extracting mechanism through the process of the present invention. To activate an embedded encrypted object, the user simply selects the encrypted object to initiate the process, launching the OOKeyMan® application, as shown in FIG. 2. The user/encrypted object authentication process is started and if the user/encrypted object is/are approved, encrypted object information can be returned and used by the user. Examples of such information include:

A. Plain Text Object Name
B. Plain Text Object Location
C. Plain Text Object Application
D. Plain Text Object Environment
E. Plain Text Object Date
F. Plain Text Object Time
G. Plain Text Object Digital Signature
H. Code word Object Tracking Label
I. Cluster Object Tracking Label
J. Device Object Tracking Label
K. Use Object Label
L. Algorithm Object Type At this point, the authenticated user is given the option to decrypt the requested embedded encrypted object 12. After decryption, a check is done to match the encrypted object's plain text object application to the correct Intelligent Auto Application Interface 14. If the correct Auto Application Interface is not found, a notice is returned and the object is copied to a temporary location 16; otherwise, the Auto Application Interface process is started. During this process, the encrypted object is matched to the appropriate authenticated application object 18 according to the returned encrypted object information. The correct authenticated application object 18 is then activated with the plain text object 20. Due to the relative dynamic nature of objects, the system of the present invention is able to accomplish all tasks "on the fly".

The scope of the DCOM directly correlates to the level at which the DCOM was embedded into the system. The scope of the DCOM covers the implemented embedded system level and all system levels above that, appearing transparent to all levels beneath the implemented embedded system level. For instance, if the present invention were embedded at the Open System Interconnection ("OSI") 7 Application layer, then the scope of the present invention would cover objects on that level and above. In this scenario, the present invention could run transparent to OSI levels 1 through 6. This implementation produces the most flexible DCOM. At this level and above, the system of the present invention is able to provide multi-level multimedia security while staying at the document level. This cross-application compatibility or document-level security is critical to the evolving component-based document centered computer system desktop. The present invention achieves cross-application multi-level multimedia security at the document level through its use of Object-Based Security.

The preferred implementation of the present invention at the application layer is OOKeyMan®. OOKeyMan® is a Microsoft® Windows™ 3.1 stand-alone application, but the present invention can be applied to other environments using other key managers. OOKeyMan® provides Document-Level Security through its use of Object Based Security.

Some examples of computer systems to which the method of the present invention can be applied to ensure the authentication and data integrity of objects include:

IBM® OS/2
IBM® System Object Method (SOM)
Microsoft® Object Package
Microsoft® Object Linking and Embedding (OLE)
Microsoft® Windows™ NT
Microsoft® Cairo Operating System
Microsoft® Chicago Operating System
Taligent (joint venture Operating System of Macintosh and IBM)
Macintosh® Compound Document Standard
Macintosh® Operating System
Novell®
Novell® Netware Directory Services (NDS)
Novell® APPWARE
Object Management CORBA (Common Object Request Broker Architecture)
Apple OPENDOC
Next PDO (Portable Distributed Objects System and Distributed Objects)
Unix Object-Oriented Systems
Virtual/Alternate Reality Systems
Other Object-Oriented Operating Systems By applying the method of the present invention to the above example computer systems, the security of a system can be moved to a more abstract object level. By securing objects with cryptography, a level of security is achieved much higher than that of common access control mechanisms such as password or passphrase protection alone.

The steps for embedding an Encrypted Embedded OOKeyMan® object are as follows:

1. User Creates a plain text Object by using a standard application;
2. User Encrypts Object with OOKeyMan®;
3. User uses a standard Container Object;
4. Using Standard object to embed Encrypted Embedded OOKeyMan® object into Container Object;
5. Encrypt Container Object;
6. Repeat Steps 1 through 5 until all Objects are encrypted; 7. Multi-Level Multimedia Security achieved at the document level.

The same method may be followed using multiple encrypted embedded OOKeyMan® objects.

Examples of The Distributed Cryptographic Object Method

The next three examples demonstrate some of the capabilities of the present invention through the OOKeyMan® implementation. The following resources were used in these examples:

Software:
MS-DOS 5.0
Microsoft® Windows™ 3.1
Microsoft® Word for Windows™ 2.0c
Standard Microsoft Object Package
WordPerfect 5.2 for Windows™
OOKeyMan 1.0b
Auto Application Interface for Word 1.0
Auto Application for WordPerfect 5.2 for Windows 1.0
Hardware:
486 50 MHz DX with 16 megabytes of RAM The examples involve two of the most popular standard Microsoft® Windows™ applications on the market today: Word™ for Windows™ and WordPerfect™ for Windows™. The examples also use a standard object, Standard Microsoft Object Package, to embed the encrypted files in a standard container object. The interfaces used for these examples were the Auto Application Interface for Word for Windows 1.0 and the Auto Application for WordPerfect 5.2 for Windows 1.0.

The first example shows the ability of OOKeyMan® to securely manage and track singly or multiply embedded encrypted objects within other encrypted objects. This is done with a single application.

The second example shows the ability of OOKeyMan® to securely manage and track singly or multiply embedded encrypted objects within other encrypted objects. The embedded encrypted objects can even be part of encrypted objects from other applications. This example is performed in a cross-application manner between Word for Windows™ and WordPerfect for Windows™.

The third example shows the standard DCOM process.

EXAMPLE 1

Document Level Multi-Level Multimedia Security (using Microsoft Word for Windows™ and WordPerfect 5.2 for Windows™)
OOKeyMan® Process:
1. Lock Object
  A. User creates an object(s) in Word for Windows™ or WordPerfect for Windows™;
  B. User Initiates OOKeyMan® sequence;
  C. User selects object(s) to encrypt;
  D. User selects labels for object;
  E. User selects an algorithm for encryption;
  F. User selects lock object;
  G. OOKeyMan® Object Manager performs Setup and Internal Checks;

H. OOKeyMan® Object Manager Calls Key Management System object;
I. OOKeyMan® Object Manager Calls Cryptographic Algorithm object;
J. OOKeyMan® Object Manager waits for Selected Algorithm object to finish and create the encrypted object;
K. Encrypted OOKeyMan® Object Created;
  i. Results in Encapsulation of
    a. Plain Text Object
    b. Plain Text Object Name
    c. Plain Text Object Location
    d. Plain Text Object Application
    e. Plain Text Object Environment
    f. Plain Text Object Date
    g. Plain Text Object Time
    h. Plain Text Object Digital Signature
    i. Code word Object Tracking Label
    j. Cluster Object Tracking Label
    k. Device Object Tracking Label
    l. Use Object Label
    m. Algorithm Object Type
  ii. Results in New Encrypted Object being created
  iii. Results in Plain Text Object Being Delete if Requested
L. OOKeyMan® Object Manager Returns To Word for Windows™ or WordPerfect for Windows™.
2. Unlock Object
  A. User creates an encrypted object(s) using Word for Windows™ or WordPerfect for Windows™;
  B. User Initiates OOKeyMan® sequence;
  C. User Selects object(s) to Decrypt;
  D. User Selects Unlock object;
  E. OOKeyMan® Decrypt Object;
  F. OOKeyMan® Object Manager performs Setup and Internal Checks;
  G. OOKeyMan® Object Manager Calls Key Management System object;
  H. OOKeyMan® Object Manager Calls Algorithm object;
  I. OOKeyMan® Object Manager waits for Selected Algorithm object to finish and create the decrypted object;
  J. If the User/encrypted Object are authenticated the plain text object is activated along with Word for Windows™ or WordPerfect for Windows™.
3. Preview Object
  A. User creates an encrypted object(s) in Word for Windows™ or WordPerfect for Windows™;
  B. User Initiates OOKeyMan® sequence;
  C. User Selects object(s) to Preview;
  D. User selects Preview Object;
  E. OOKeyMan® Display Header Object;
  F. OOKeyMan® Object Manager performs Setup and Internal Checks;
  G. OOKeyMan® Object Manager Calls Key Management System object;
  H. OOKeyMan® Object Manager waits for Selected Algorithm object to finish and create the Header object.

EXAMPLE 2

Cross-Application Multi-Level Multimedia Security at The Document Level (Between Microsoft® Word for Windows™ and WordPerfect 5.2 for Windows™)
OOKeyMan® Process:
1. Lock Object
  A. User creates an object(s) in Word for Windows™ or WordPerfect for Windows™;
  B. User Initiates OOKeyMan® sequence;
  C. User Selects object(s) to Encrypt;
  D. User Selects Labels for object;
  E. User selects an algorithm for encryption;
  F. User Selects Lock Object;
  G. OOKeyMan® Object Manager performs Setup and Internal Checks;
  H. OOKeyMan® Object Manager Calls Key Management System object;
  I. OOKeyMan® Object Manager Calls Cryptographic Algorithm object;
  J. OOKeyMan® Object Manager waits for Selected Algorithm object to finish and create the encrypted object;
  K. Encrypted OOKeyMan® Object Created;
    i. Results in Encapsulation of
      a. Plain Text Object
      b. Plain Text Object Name
      c. Plain Text Object Location
      d. Plain Text Object Application
      e. Plain Text Object Environment
      f. Plain Text Object Date
      g. Plain Text Object Time
      h. Plain Text Object Digital Signature
      i. Code word Object Tracking Label
      j. Cluster Object Tracking Label
      k. Device Object Tracking Label
      l. Use Object Label
      m. Algorithm Object Type
    ii. Results in New Encrypted Object being created
    iii. Results in Plain Text Object Being Delete if Requested
  L. OOKeyMan® Object Manager Returns To Word for Windows™ or WordPerfect for Windows™.
2. Unlock Object
  A. User creates an encrypted object(s) in Word for Windows™ or WordPerfect for Windows™;
  B. User Initiates OOKeyMan® sequence;
  C. User Selects object(s) to Decrypt;
  D. User Selects Unlock object;
  E. OOKeyMan® Decrypt Object;
  F. OOKeyMan® Object Manager performs Setup and Internal Checks;
  G. OOKeyMan® Object Manager Calls Key Management System object;
  H. OOKeyMan® Object Manager Calls Algorithm object;
  I. OOKeyMan® Object Manager waits for Selected Algorithm object to finish and create the decrypted object;
  J. If the User/encrypted Object are authenticated the plain text object is activated along with Word for Windows™ or WordPerfect for Windows™.
3. Preview Object
  A. User creates an encrypted object(s) in Word for Windows™ or WordPerfect for Windows™;
  B. User Initiates OOKeyMan® sequence;
  C. User Selects object(s) to Preview;.
  D. User selects Preview Object;
  E. OOKeyMan® Display Header Object;
  F. OOKeyMan® Object Manager Performs Setup and Internal Checks;
  G. OOKeyMan® Object Manager Calls Key Management System object;
  H. OOKeyMan® Object Manager waits for Selected Algorithm object to finish and create the Header object.

EXAMPLE 3

Standard Distributive Cryptographic Object Method Process (DCOMP)

OOKeyMan® Process:
1. Lock Object
  A. User creates an object(s);
  B. User Initiates OOKeyMan® sequence;
  C. User Selects object(s) to Encrypt;

D. User Selects Labels for object;
E. User Selects an algorithm for encryption;
F. User Selects Lock Object;
G. OOKeyMan® Object Manager Performs Setup and Internal Checks;
H. OOKeyMan® Object Manager Calls Key Management System object;
I. OOKeyMan® Object Manager Calls Cryptographic Algorithm object;
J. OOKeyMan® Object Manager waits for Selected Algorithm object to finish and create the encrypted object;
K. Encrypted OOKeyMan® Object Created;
  i. Results in Encapsulation of
    a. Plain Text Object
    b. Plain Text Object Name
    c. Plain Text Object Location
    d. Plain Text Object Application
    e. Plain Text Object Environment
    f. Plain Text Object Date
    g. Plain Text Object Time
    h. Plain Text Object Digital Signature
    i. Code word Object Tracking Label
    j. Cluster Object Tracking Label
    k. Device Object Tracking Label
    l. Use Object Label
    m. Algorithm Object Type
  ii. Results in New Encrypted Object being created
  iii. Results in Plain Text Object Being Delete if Requested
L. OOKeyMan® Object Manager Returns To Application Object.
2. Unlock Object
A. User creates an encrypted object(s);
B. User Initiates OOKeyMan® sequence;
C. User Selects object(s) to Decrypt;
D. User Selects Unlock object;
E. OOKeyMan® Decrypt Object;
F. OOKeyMan® Object Manager Performs Setup and Internal Checks;
G. OOKeyMan® Object Manager Calls Key Management System object;
H. OOKeyMan® Object Manager Calls Algorithm object;
I. OOKeyMan® Object Manager waits for Selected Algorithm object to finish and create the decrypted object.
3. Preview Object
A. User creates an encrypted object(s);
B. User Initiates OOKeyMan® sequence;
C. User Selects object(s) to Preview;
D. User selects Preview Object;
E. OOKeyMan® Display Header Object;
F. OOKeyMan® Object Manager Performs Setup and Internal Checks;
G. OOKeyMan® Object Manager Calls Key Management System object;
H. OOKeyMan® Object Manager waits for Selected Algorithm object to finish and create the Header object.

The process of the present invention can be applied to a vast number of areas in the real world. Whether it be the physical topology of the local area network/wide area network environment or the dynamic structure of an organization, the DCOM process will change dynamically to reflect the current state of the object in question.

Figure 3:
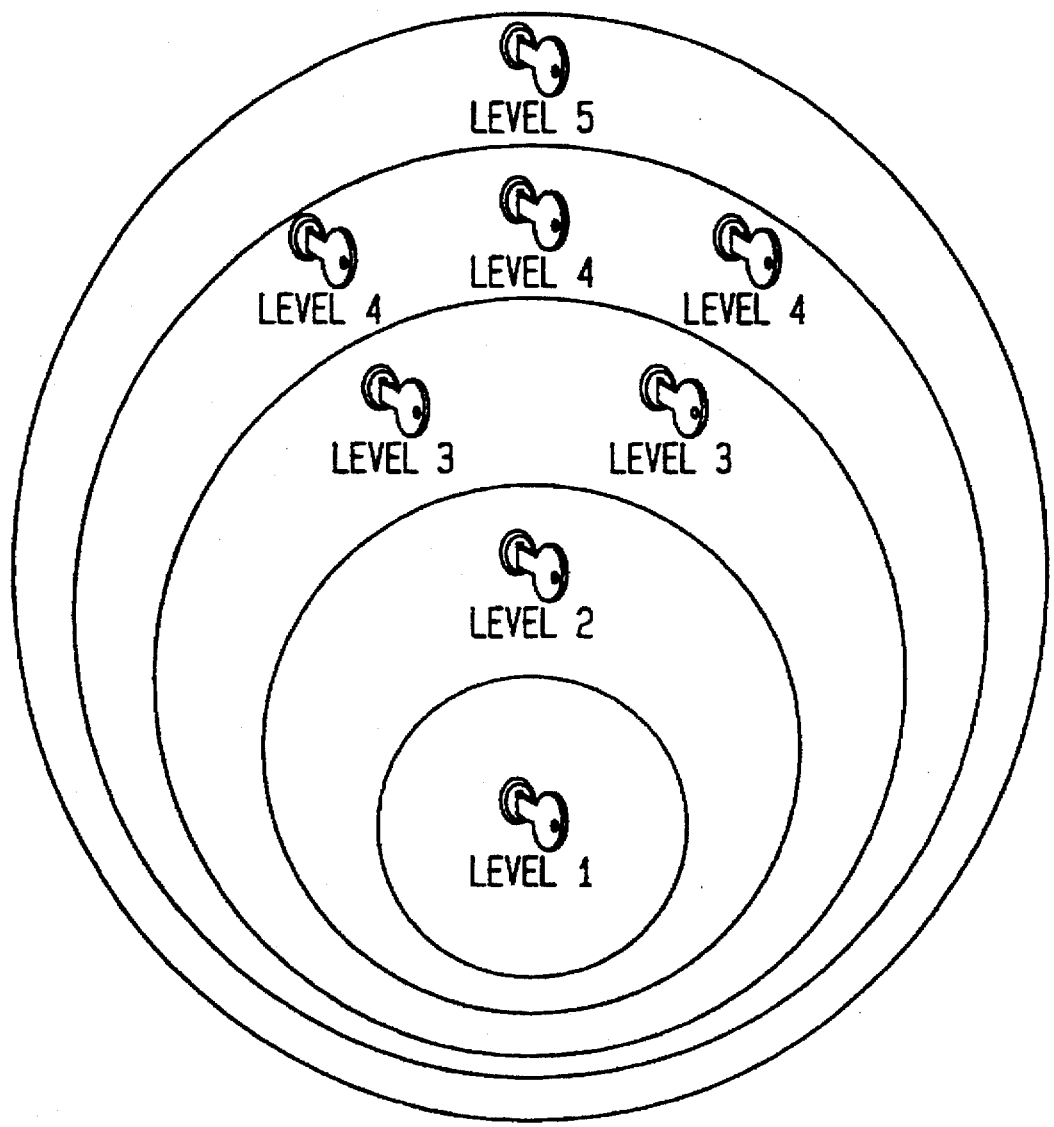
FIG. 3 shows an object containing ten embedded encrypted objects at five various levels.
Figure 4:
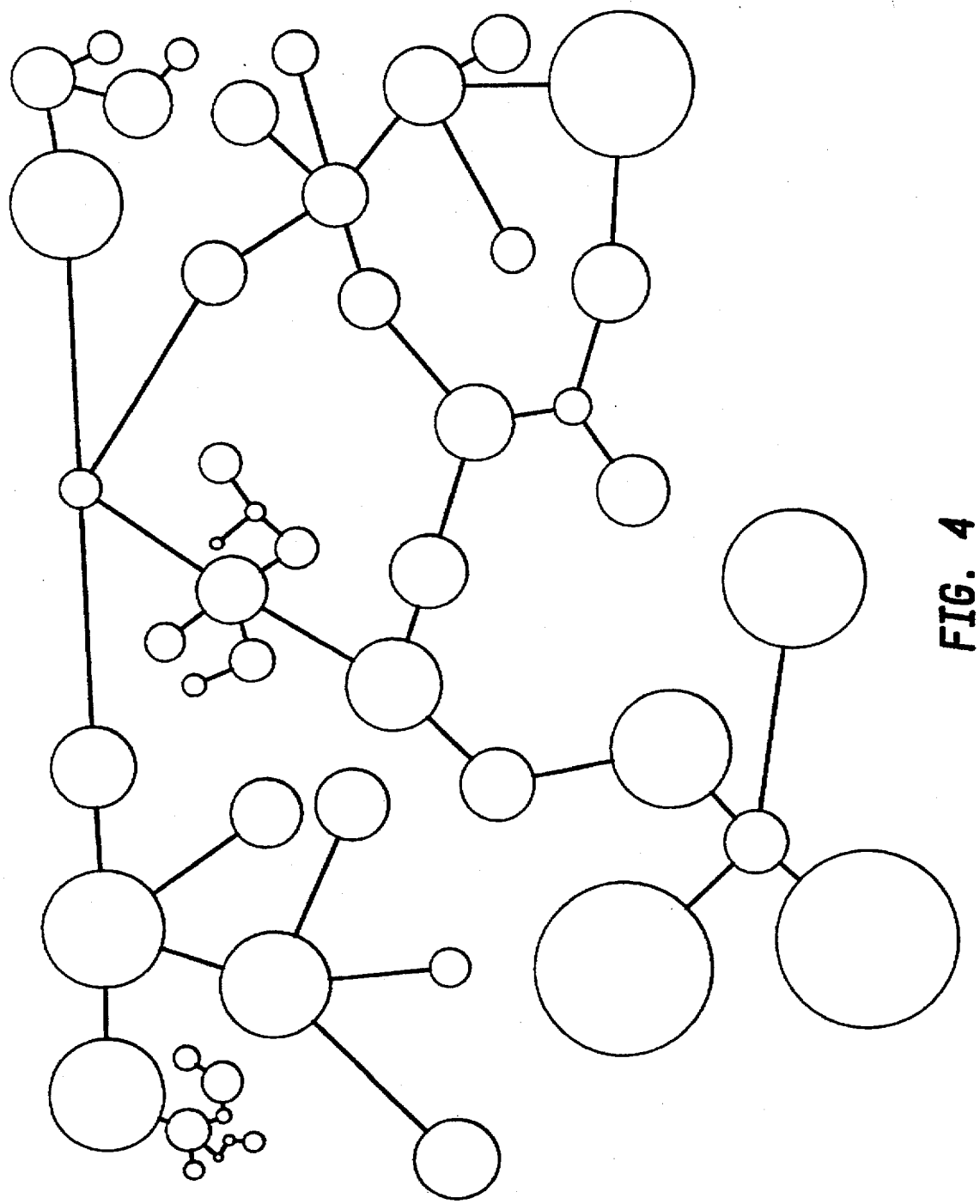
FIG. 4 shows an encrypted object that contains a web of embedded encrypted objects nested within it.

FIG. 3 and FIG. 4 show an encrypted object that contains a web of embedded encrypted objects nested within the other encrypted objects. The object shown in FIG. 3 contains ten embedded encrypted objects at five various levels. The encrypted object embedded in level 5 was embedded in an object in level four, level four objects in level 3 and so on. The plain text object containing the level 5 encrypted object can then be encrypted for further security. This single encrypted object encapsulates all of the data associated with the encrypted objects within it and therefore the entire encrypted object can then be sent out via any transport mechanism supporting binary file transfer.

FIG. 4 shows an encrypted object that contains a web of embedded encrypted objects nested within it. All of the attached embedded encrypted objects are fused together resulting in a single encapsulated encrypted object. The system of the present invention is powerful enough to dynamically adapt to accommodate N dimensional objects.

Figure 5:
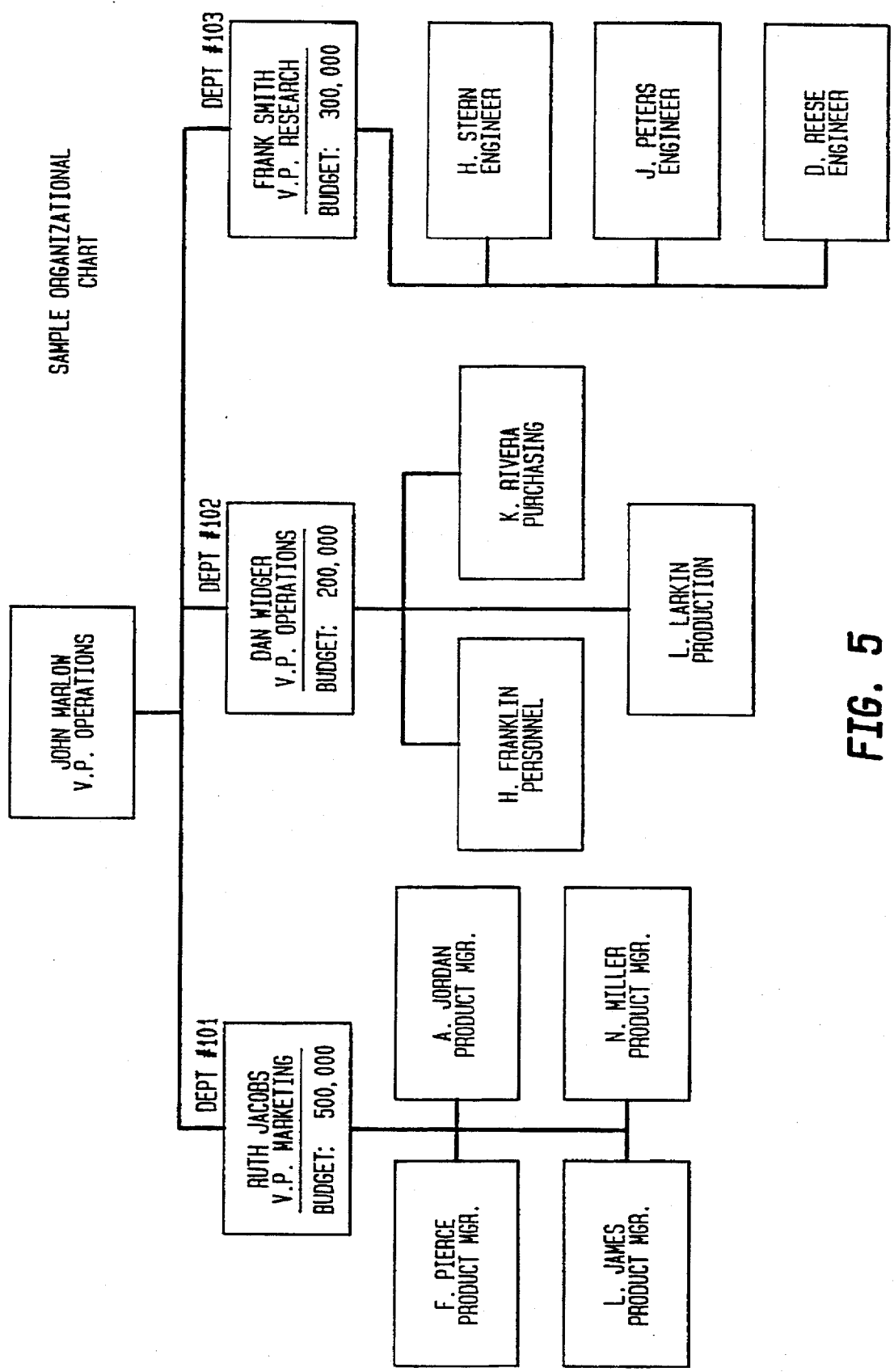
FIG. 5 shows a sample organizational chart.
Figure 6:
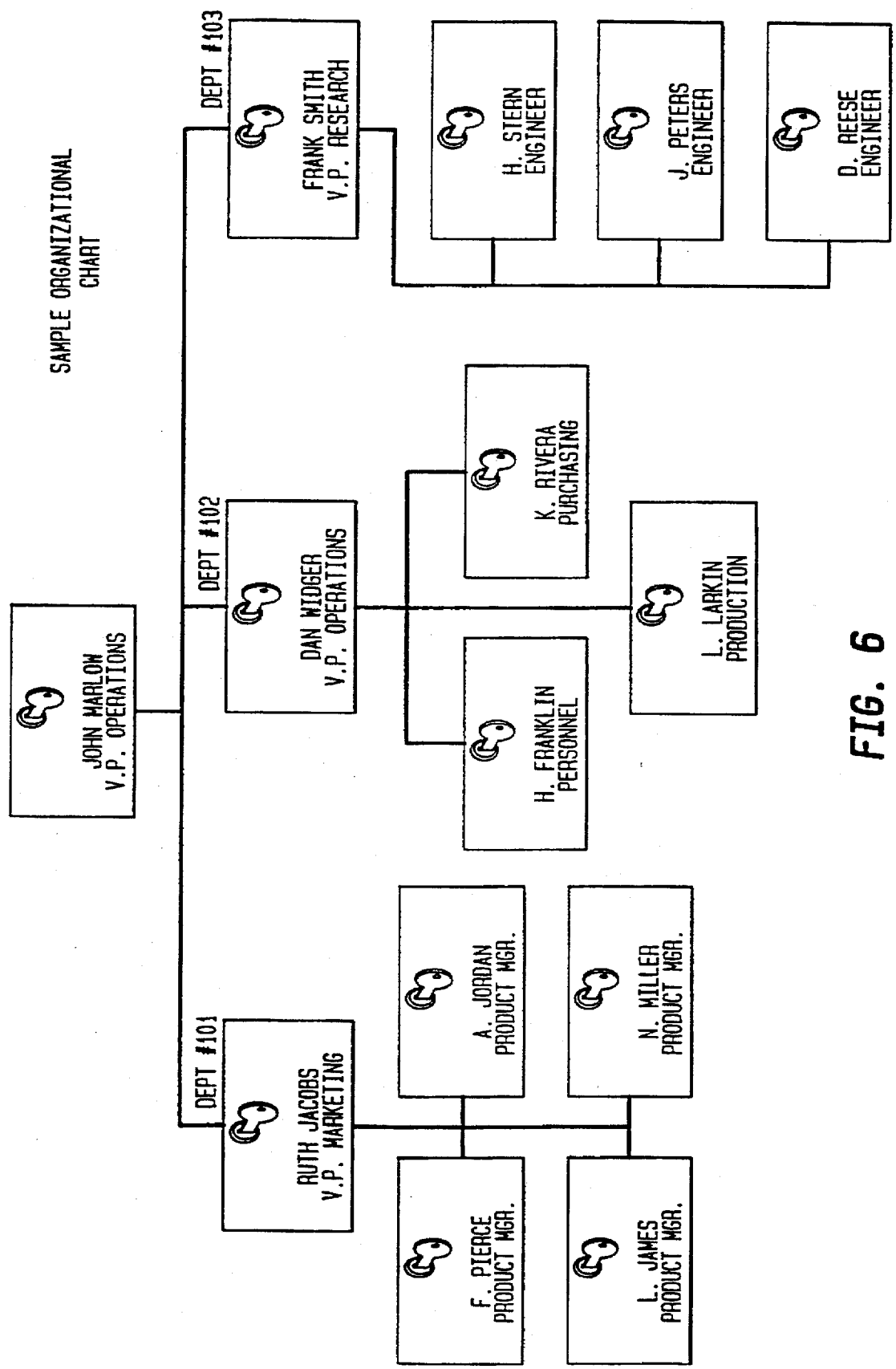
FIG. 6 shows the present invention used in conjunction with the dynamic structure of a sample organizational chart.
Figure 7:
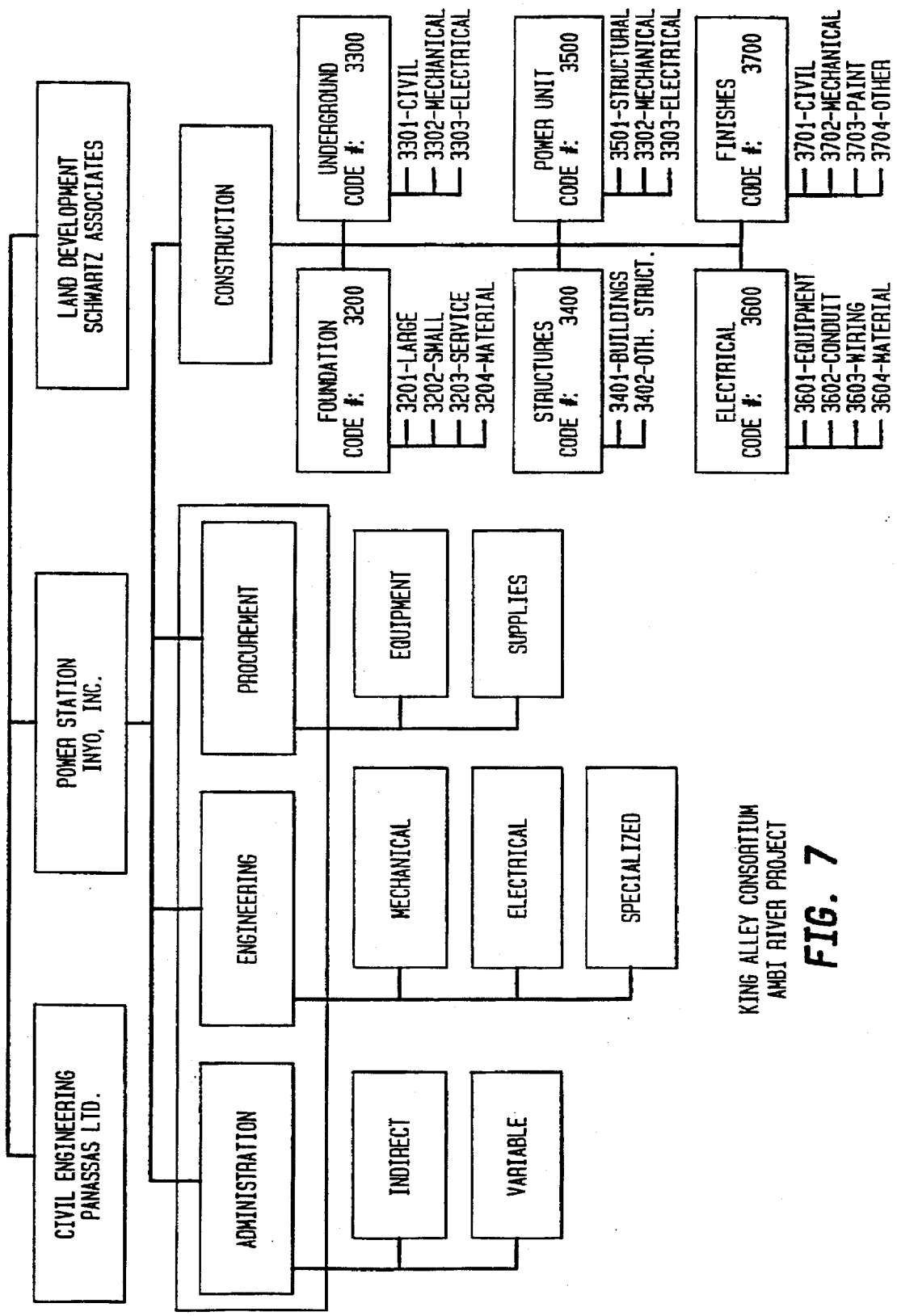
FIG. 7 shows a larger, more complicated sample organizational chart.
Figure 8:
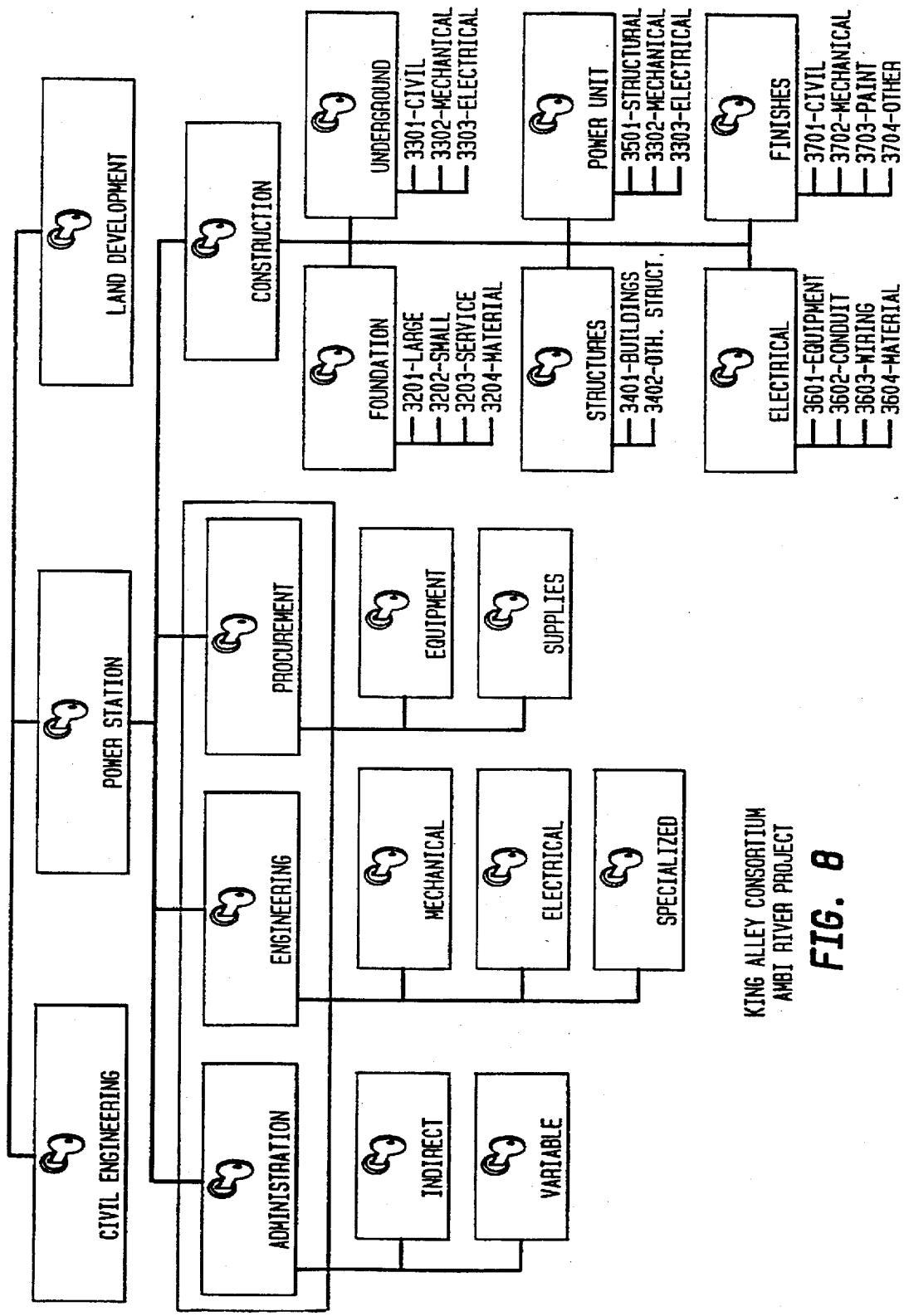
FIG. 8 shows the present invention used in conjunction with the dynamic structure of the larger, more complicated sample organizational chart.

The single encrypted objects shown in both FIGS. 3 and 4 can act as a secure package and can be sent out for distribution to an entire organization (e.g., E-mail). This single encrypted object can represent a branch(es), department(s), or even an entire company. Every employee would receive the single encrypted file, but they would only be able to unravel the portions that corresponded to them and acquire no knowledge of other existing embedded encrypted objects. For example, FIG. 5 displays a sample organization chart. When applied, the system of the present invention will control the knowledge/information flow of the organization and will allow for clear data separation, further compartmentalization through multiple algorithm use, and document-level security. With the improved communication paths, an organization would become more efficient. FIG. 6 demonstrates the use of the DCOM in conjunction with the dynamic structure of a sample organization. Since the system of the present invention is dynamic in nature, it can adapt to any organizational size or type (For example, see FIGS. 7 and 8).

Preferred and alternate embodiments of the present invention have now been described in detail. It is to be noted, however, that this description of these specific embodiments is merely illustrative of the principles underlying the inventive concept. It is therefore contemplated that various modifications of the disclosed embodiments will, without departing from the spirit and scope of the invention, be apparent to persons of ordinary skill in the art.

What is claimed is:

1. A method for providing multi-level multimedia security in a data network, comprising:
  a) accessing an object-oriented key manager;
  b) selecting a first object to encrypt;
  c) selecting a first label for the first object;
  d) encrypting the first object;
  e) labelling the encrypted first object;
  f) displaying the first label as a header array;
  g) reading the first object label;
  h) determining access authorization based on the first object label; and
  i) decrypting the first object if access authorization is granted.

2. The method of claim 1, further comprising embedding the encrypted first object in a second object after labelling the encrypted first object.

3. The method of claim 2, further comprising:
  a) selecting a second label for the second object;
  b) encrypting the second object;
  c) labelling the encrypted second object with a second object label; and
  d) incorporating the second label into the header array.

4. The method of claim 3, further comprising:
  a) reading the header array;

b) determining access authorization based on the second object label; and c) decrypting the second object if access authorization is granted.

5. The method of claim 4, further comprising presenting a representation of the first object only if access authorization is granted according to the second object label.

6. The method of claim 2, wherein the encrypted first object is a printer object.

7. The method of claim 1, wherein the first object is an application document, and further comprising:

a) creating the first object in an application prior to accessing the object-oriented key manager; and b) returning the encrypted first object to the application prior to reading the first object label.

8. The method of claim 7, wherein access authorization is print-only authorization.

9. The method of claim 1, further comprising:

a) compressing the first object prior to encrypting the first object; and b) decompressing the first object after decrypting the first object.

10. The method of claim 1, further comprising:

a) compressing the first object immediately prior to encrypting the first object; and b) decompressing the first object immediately after decrypting the first object.

11. The method of claim 1, further comprising:

a) arranging a plurality of encrypted objects such that at least some of the plurality of encrypted objects are embedded within others of the encrypted objects;

b) selecting a label for each of at least some of the plurality of encrypted objects;

c) labelling each of the plurality of encrypted objects for which a label was selected;

d) incorporating each of the labels into the header array.

12. The method of claim 11, further comprising:

a) reading a selected label;

b) determining access authorization to the object associated with the selected label based on the selected label and further based on all labels associated with objects in which the associated object is embedded; and c) decrypting the associated object if access authorization is granted.

13. The method of claim 1, wherein the header array is an access control list separate from the encrypted first object.

14. A system for providing multi-level multimedia security in a data network, comprising:

A) digital logic means, the digital logic means comprising:

1) a system memory means for storing data;

2) an encryption algorithm module, comprising logic for converting unencrypted objects into encrypted objects, the encryption algorithm module being electronically connected to the system memory means for accessing data stored in the first system memory;

3) means for arranging a plurality of encrypted objects such that at least some of the plurality of encrypted objects are embedded within others of the encrypted objects;

4) an object labelling subsystem, comprising logic means for limiting object access, subject to label conditions of a selected object and further subject to conditions of all labels associated with objects in which the selected object is embedded, the object labelling subsystem being electronically connected to the system memory means for accessing data stored in the system memory means and the object labelling subsystem being further electronically connected to the encryption algorithm module to accept inputs from the encryption algorithm module;

5) a decryption algorithm module, comprising logic for converting encrypted objects into unencrypted objects, the decryption algorithm module being electronically connected to the system memory means for accessing data stored in the system memory means; and 6) an object label identification subsystem, comprising logic for limiting object access, subject to label conditions, the object label identification subsystem being electronically connected to the system memory means for accessing data stored in the system memory means and the object label identification subsystem being further electronically connected to the decryption algorithm module to accept inputs from the deception algorithm module.

B) the encryption algorithm module working in conjunction with the object labelling subsystem to create an encrypted object such that the object label identification subsystem limits access to an encrypted object.

15. The system of claim 14, wherein the digital logic means further comprises means for accessing computer program applications stored in the system memory means.

16. The system of claim 14, wherein one of the encrypted objects is a printer object.

17. The system of claim 14, further comprising means for compressing one of the encrypted objects and means for decompressing one of the encrypted objects.

* * * * *